Figure 1:
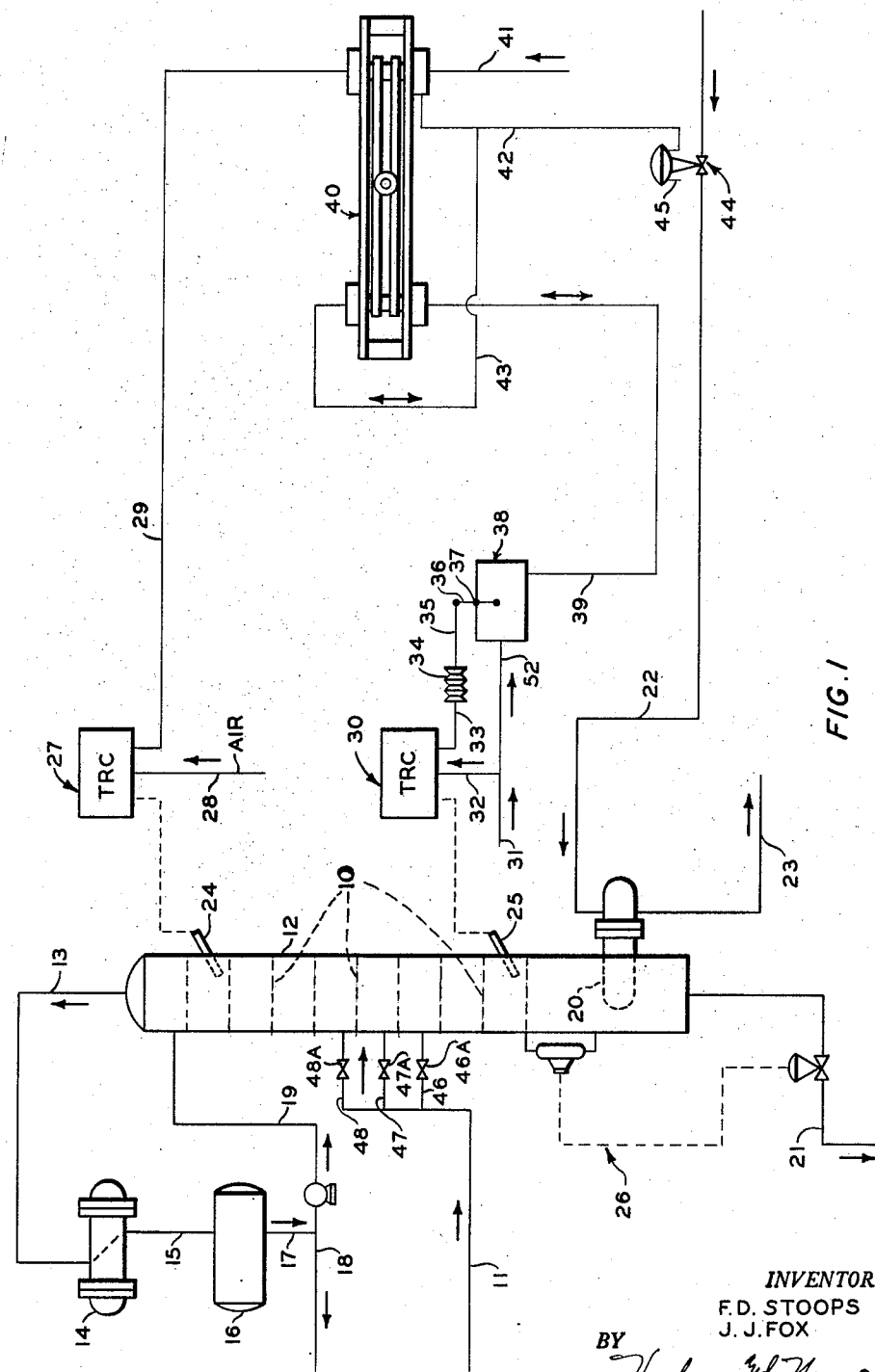

INVENTORS.
F. D. STOOPS
J. J. FOX

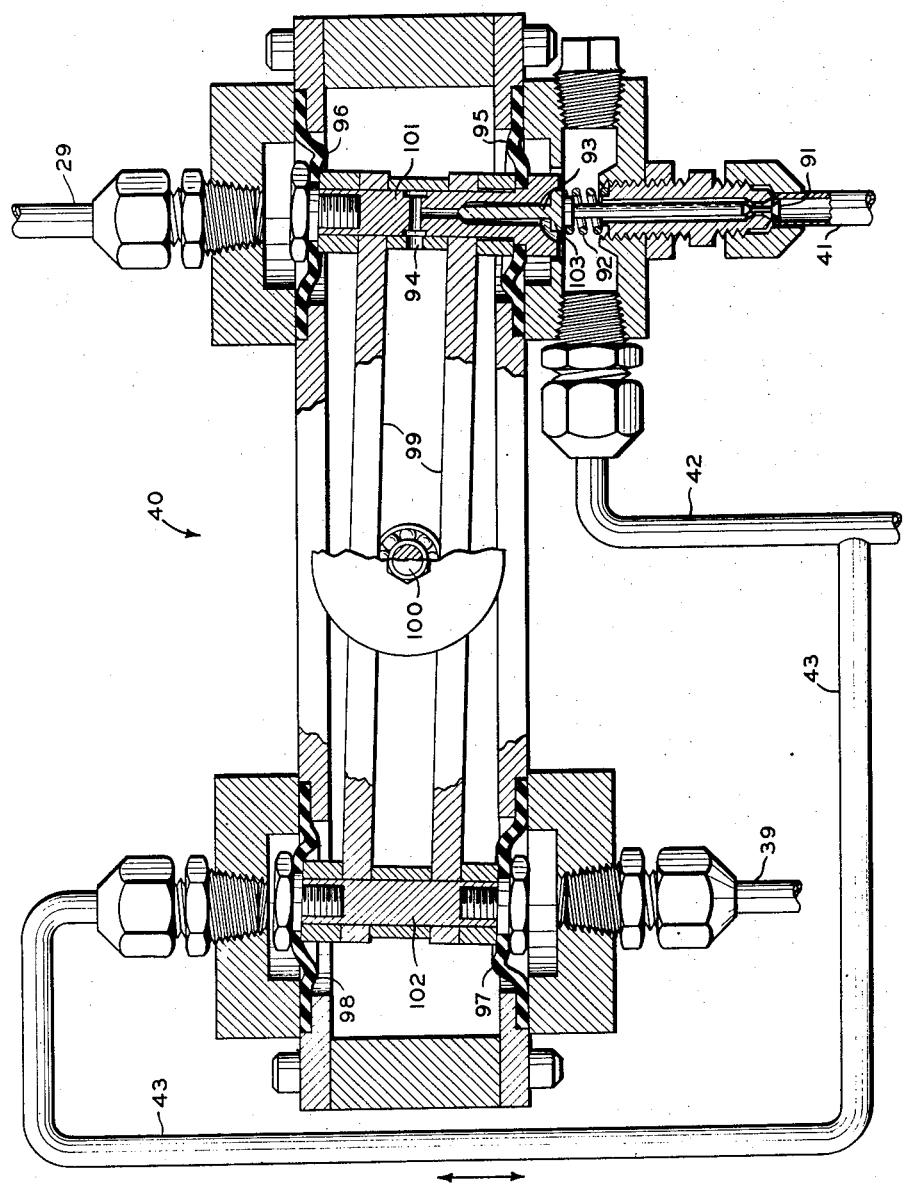

United States Patent Office 2,758,793
Patented Aug. 14, 1956

2,758,793

PROCESS TEMPERATURE CONTROL

Forrest D. Stoops and Jack J. Fox, Bartlesville, Okla., assignors to Phillips Petroleum Company a corporation of Delaware Application January 7, 1952, Serial No. 265,339

5 Claims. (Cl. 236—20)

This invention relates to process temperature control. In one aspect it relates to a method for process control involving the use of two temperature control points wherein temperature changes are minimized. In another aspect it relates to a method for temperature control of a process wherein one temperature control point is used to control the flow of heating medium to the process except when temperature at a second point is outside of a predetermined temperature range. Under this latter condition, the second point indicates and anticipates a wide change in temperature at the first point. The second point is used to actuate an averaging control on flow of heating medium to the process thereby to minimize the indicated temperature variation.

Our invention is applicable to the control of such processes as fractional distillation, dephlegmation, catalytic reactions, noncatalytic reactions, polymerizations, and the like. Our method of temperature control can be used for control of substantially any continuous process which is controllable in response to temperature.

In many chemical industries, mixtures of fluid materials containing at least some liquid are separated into constituent parts or fractions. The control of such an operation is complicated in view of many variable operating conditions. While our apparatus and process have general application, we will describe the apparatus and method of its use when applied to the control of a fractional distillation operation. In the oil industry fractional distillations are very common-place operations. Some materials to be fractionated into component parts require below atmospheric temperature conditions while most operations require temperature conditions well above atmospheric.

While we will give hereinbelow as an example the operation of a fractional distillation column taking an overhead product, in which the primary control point is above the feed point and the secondary control point is below the feed point, the operation can be reversed with the primary control point below and the secondary control point above the feed point. This reversal is preferred if the desired stream is a kettle product.

In such operation as catalytic, or thermal polymerization reaction processes, the primary control point may be the optimum temperature point of reaction control and the secondary control as the preheat range or anticipating control point.

An object of our invention is to devise a method and apparatus for controlling the operation of continuous processes.

Another object of our invention is to devise a method and apparatus for minimizing temperature fluctuations at one point while controlling addition of heat at said point from temperature changes at a second point.

Another object of our invention is to devise a method and apparatus for properly controlling such fractional distillation operations.

Another object of our invention is to provide a method and apparatus for minimizing the temperature changes in the region of the reboiler section of the fractional distillation column while at the same time at least partially controlling the operation from the conventional critical control point.

Still another object of our invention is to provide an automatically operable assembly of apparatus parts for carrying out such operations.

Still other objects and advantages of our invention will be realized upon reading the following description, which taken with the attached drawing forms a part of this specification.

The present invention comprises a heater in a packed process vessel, a first temperature responsive device disposed to respond to temperature changes at a first point in said vessel spaced from said heater and operatively connected to control and vary the heat supplied to said vessel by said heater approximately in inverse proportion to the temperature at said first point, and a second temperature responsive device disposed to respond to temperature changes at a second point in said vessel between and spaced from said heater and said first point, said second device being operatively connected to override the control of said first device at predetermined maximum and minimum at said second point and vary the heat supplied to said vessel as an inverse function of the temperature at said second point.

During the course of a fractional distillation operation, condition changes which cause variations in operation are many. For example, in a conventional fractional distillation operation, a change in the composition of the feed stock, a change in its temperature, a change in the composition or temperature of reflux, a change in the input of heat to the feed stream and/or the reboiler section of the column and changes of pressure have effects on the operation of such a column. If the quantity of the feed stock increases or if its composition changes rather abruptly, more heat may be required in the kettle section to obtain an overhead product of uniform composition. When the feed varies as mentioned, there may be a cooling effect in the region of the feed point, which cooling effect retards the flow of heat upward in the column with the result that the amount of overhead product removed from the column is reduced in quantity and altered in quality.

In conventional column operation a temperature control point is selected which will give the most uniform continuous desired product. Fractionation may be operated with constant heat input and variable reflux or constant reflux and variable reboiler heat input when feed and pressure are constant. Obviously whichever method is used the temperature control will operate the proper variable. Since variable heat input is common to many fractionators and is applicable to catalytic and thermal reaction processes that method is probably utilized to a greater extent than the first mentioned control. The control point of the column may be selected at some point in the region of the feed point, a few trays above or below the feed point, and at which there is normally considerable temperature variation. The control point of the column may be selected at some point within a region between a few trays above the feed point and a few trays below the top of a column, or at a point within a region between a few trays below the feed point and a few trays above the bottom of the column. On each tray within these two regions relatively constant temperatures exist as long as such operating conditions as feed composition, temperature, and rate, reflux temperature, composition and rate and the like remain constant. However such conditions seldom remain constant, and when one or more of these conditions change, temperature variations on a given tray occur. When a thermocouple is provided at such a control point it may be utilized to control the steam input to the reboiler, reflux, or feed, and when controls are properly utilized the maximum temperature variations at the control point may be expected to be minimized. We have found, however, that in many cases that the steam to the reboiler is not properly controlled from a critical-control point as just mentioned. For example, following a normal increase in the steam input into the reboiler, a considerable time lag occurs until the critical-control point experiences an increase in temperature. During this interval of time steam is being continuously increased to the reboiler with the result that by the time the heat front reaches the critical-control point, the kettle section and its general region may be overheated. When such a condition exists and the heat front finally reaches the critical-control point, the thermocouple then with its auxiliary apparatus operates to throttle the steam input to the reboiler coil. When this steam input has been throttled, the increased heat front from the previously increased steam continues to rise up the column and the critical control point becomes somewhat overheated before the reduced steam input to the reboiler has taken its effect. When the critical-control point has thus become overheated the heat front may continue to rise in the column until its presence is felt on the top tray with the result that undesired material is taken overhead from the column. With the steam input throttled and materially decreased to the reboiler coil, a considerable time lag is experienced until the lower temperature heat front reaches the critical-control point. When the lower temperature heat front reaches the critical-control point then the thermocouple operates to increase the steam flow to the reboiler, but due to the time lag required for the low temperature heat front to reach the critical-control point the critical-control point may become underheated before the effect of increased reboiler heat is felt.

Figure 2:
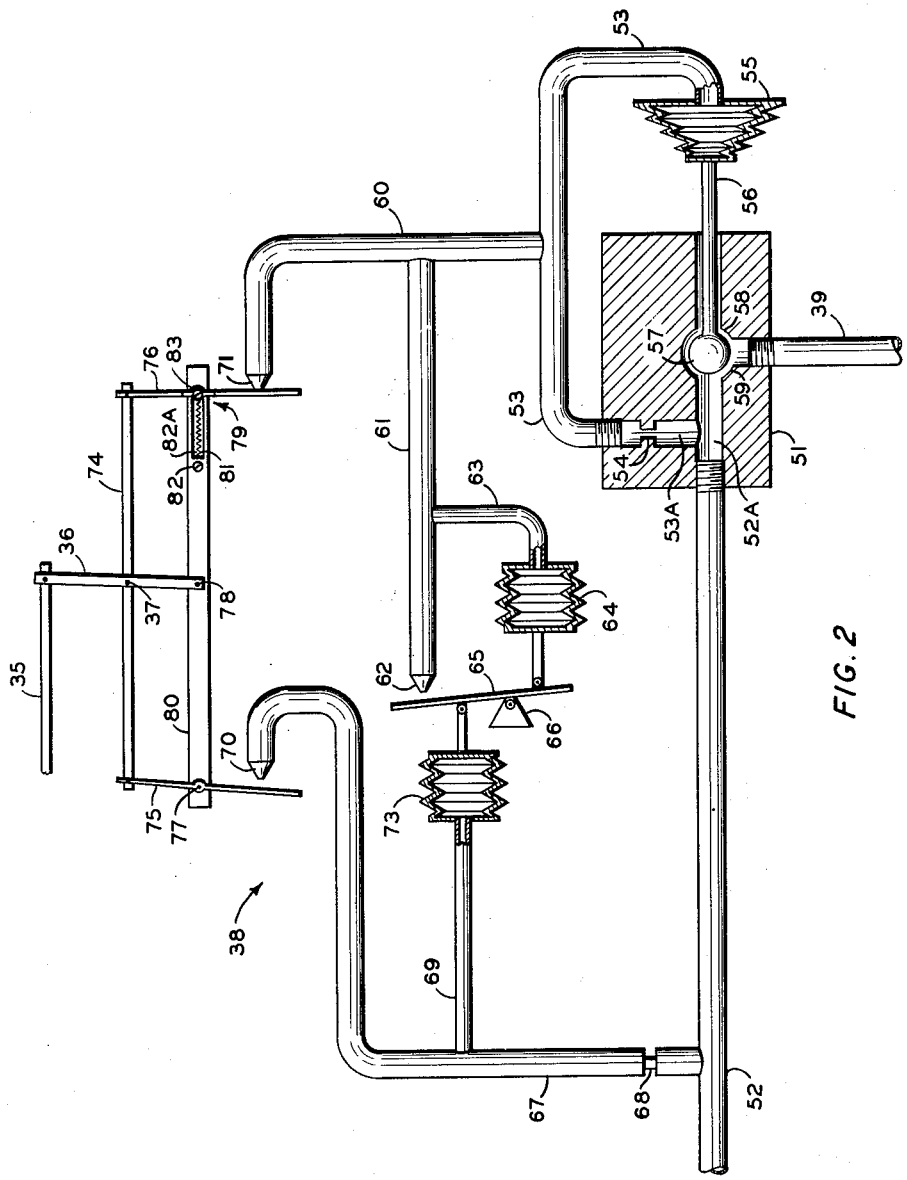

Figure 1 is a diagrammatic view of one embodiment of apparatus of our invention. Figure 2 is a diagrammatic view, in detail, of a portion of the apparatus of Figure 1. Figure 3 is a detailed view in diagrammatic form of another portion of the apparatus of Figure 1.

Referring now to the drawing and specifically to Figure 1, we will describe the application of the principles of our invention to the control of a fractional distillation operation. In this respect, reference numeral 12 is intended to identify a conventional fractional distillation column such as those commonly used in the petroleum industry. Such a column as column 12 is ordinarily fitted with bubble-cap-tray liquid-vapor contacting or packing apparatus 10 or such other fluid phase contacting apparatus as may be desired. This contacting apparatus is not illustrated in the drawing, nor further described for purposes of simplicity, since its installation and use is well understood by those skilled in the art.

A pipe 11 is connected to column 12 by way of manifold pipes 46, 47 and 48 which are provided, respectively, with valves 46A, 47A and 48A, at about the midsection of the column. These pipes 46, 47 and 48 are feed pipes through one or more of which material to be fractionated is introduced into the column. A plurality of feed points permits selection of inlet points to match feed composition with column composition. This column is provided with an overhead vapor withdrawal line 13. This line 13 connects with a condenser 14, which is connected to an accumulator tank 16 by a pipe 15. From the bottom of the accumulator tank a pipe 17 conducts liquid material through line 19 into the top of the tower or through line 18 from the system, as desired. In conventional fractional distillation operation, conduit 19 is termed a reflux line and some overhead condensate material from the accumulator 16 is passed through line 19 and introduced into the top of the column on the top tray for refluxing purposes. Overhead condensate not required for refluxing is removed from the system through the product line 18. In the bottom of the column is provided a heat exchanger 20 which is termed a reboiler heater. As illustrated, this exchanger may be adapted to utilize steam from a line 22, while a line 23 carries exhaust steam and/or condensate from the exchanger 20. A conduit 21 disposed in the bottom of the fractionator is intended for removal of the bottoms product. Reference numeral 26 refers broadly to a float controller motor valve assembly which apparatus is used commonly for removal of bottoms product in response to the level of the accumulated liquid.

We will explain the operation of this fractionating column for separating and recovering butane from a natural gasoline containing butane and higher boiling hydrocarbons, in such a column, which may contain for example 50 trays disposed from the top of the column to a point slightly above the reboiler heater 20. For identifying individual trays and their relative position in the column we will number the trays from bottom to top of the column in such a manner that tray No. 1 is the tray closest to the heater 20, while tray No. 50 will be nearest the top of the column.

In such an operation we will introduce the feed stock from the feed line 11 through line 47 and valve 47A into the column on tray No. 19. A thermocouple 24 is inserted in the upper side wall of the column to dip into the liquid contents on tray No. 31. This thermocouple 24 is attached by conventional lead wires to a conventional temperature recorder controller, broadly identified by reference numeral 27. Such controllers are well known apparatus and may be obtained commercially from many instrument supply houses. In relation to the controller 27, instrument air is conducted from a source not shown, to the controller through an air line 28. Conduit or tube 29 carries air under controlled pressure from the controller 27 to the apparatus 40. The term instrument air is used herein synonymously with the term pressure fluid.

The apparatus 40 is a ratio totalizer or an averaging apparatus such as manufactured by the Hagan Corporation of Pittsburgh, Pa. This apparatus 40 termed the ratio totalizer is diagrammatically illustrated in Figure 1 and is shown in somewhat greater detail in Figure 3 of the drawing.

According to our invention we provide a second thermocouple 25 installed in the side wall of the fractionator 12 at a point some little distance above the reboiler of the column. It is preferable to install the thermocouple 25 at some little distance above the reboiler since operation at such a selected position is a little more steady and serves better as a control point than in the immediate vicinity of the reboiler. In this butane fractionation operation we will consider the thermocouple 25 as dipping into the liquid on tray No. 7. This thermocouple 25 is attached by conventional lead wires to a temperature recorder controller 30 which is a similar apparatus to the controller 27. Pressure fluid is conducted to this controller 30 from a source, not shown, through pipes 31 and 32. Pipe 33 leads controlled pressure fluid from the controller to a bellows 34. To the end of the bellows 34 opposite from pipe 33 is attached a push-pull pin or rod 35. This rod is pivoted to a lever 36. This lever extends into a controller apparatus 38, being pivoted thereto at a pivot point or fulcrum 37. Instrument air is conducted to this controller apparatus 38 through a conduit 52 from conduit 31. Tube 39 is attached to the controller 38 at the point illustrated and leads to a point on the bottom side of the ratio controller 40 as shown for passage of pressure fluid. Pressure fluid for operating a pressure fluid operable motor of a normally closed throttle valve 44 is conducted to the ratio controller 40 through a line 41, from a source, not shown. A tube 42 conducts this pressure fluid from the ratio totalizer 40 to the underside of said diaphragm of said diaphragm operated motor valve assembly 44. Also attached to the housing on the underside of the diaphragm of this valve motor is a bleed tube 45. To the tube 42 is attached a tube 43, the other end of which is attached to the top of this ratio totalizer 40 directly above the point at which tube 39 is attached.

This ratio totalizer is illustrated in greater detail in Figure 3 of the drawing. On reference to this figure, tube 39 is attached to the body of the totalizer 40 at the point illustrated and is intended to conduct air under pressure to the underside of a diaphragm 97. Directly above this diaphragm 97 is a second diaphragm 98 which is intended to operate under the influence of air pressure from tube 43. A post or column 102 is connected rigidly with the center portion of the diaphragm 98 and the center portion of the diaphragm 97 so that when diaphragm 97 moves upward for example, the column 102 and the diaphragm 98 will also move upward and vice versa. This column or post 102, while moving generally vertically, actually moves around a pivot point or fulcrum 100. The horizontal component of the movement of post 102 is, however, very small. Attached directly to the post 102 are two horizontal bars or beams 99, one of which is above and one below the fulcrum 100. These beams 99 extend from the post 102 to a post 101 on the opposite end of this piece of apparatus. This post 101 is in general more or less similar to post 102, but differs in some important respects. The top of post 101 is attached rigidly to a diaphragm 96, while the bottom is attached rigidly to a diaphragm 95. The bottom center of the post 101 is drilled axially for some little distance to accommodate a push pin 93. The post 101 is provided with a continuation of the aforementioned axial opening of smaller diameter, however, and also with a horizontal opening 94. This push pin 93 is intended to act in conjunction with said additional opening as a bleed valve in such a manner that when the post 101 is up air pressure passes through the bleed opening 94, while when the post is down air pressure bleeds more slowly through the opening 94. The bottom end of this push pin 93 is attached more or less directly to a poppet type valve 91. This poppet valve 91 is installed in a generally upside-down position in such a manner that the valve head is down and the stem points upward. The upper end of the stem of this valve is attached rigidly to a plate 103. A compression spring 92 is provided below this plate 103 in such a manner as to bias the valve 91 in a normally closed position. The bottom end of the push pin 93 is also attached rigidly to this plate 103 in such a manner that the push pin 93, plate 103 and valve 91 move upward or downward as a unit.

In Figure 2 reference numeral 35 is the push-pull rod 35 of Figure 1. This rod is pivoted to the lever 36 which in turn is pivoted at 37 to a stationary member 74. This stationary member 74 may represent the top horizontal line of the rectangle of Figure 1 representing this controller and identified by reference numeral 38. To one end of this stationary element 74 is pivoted a baffle member 75. At about a midpoint of this baffle 75 is attached a horizontally disposed movable bar 80 by a pivot 77. The lever 36 extends beyond pivot point 37 and is pivoted to this movable bar 80 by a pivot 78. A baffle 76 is pivoted to the other end of member 74 and to a compression spring 81 at a pivot point 83. This compression spring-pivot assembly is generally identified by reference numeral 79 and may be termed a spring loaded pivot. The other end of this compression spring 81 is attached at point 82 to the movable bar 80. The spring 81 is preferably installed in an elongated slot 82A in the movable bar 80 as illustrated. Likewise the baffle 76 may extend downward through a vertical opening in the bar 80 or may be split as a yoke surrounding the bar 80 in such a manner that the lower end of the baffle 76 may be moved from its position against or adjacent a bleed orifice 71 as illustrated in Figure 2 to a position to the left of orifice 71, under which condition the compression spring 81 is not compressed. When movable bar 80 is moved to the right, the compression spring 81 holds the baffle 76 against the air bleed 71 in the position illustrated in Figure 2.

The lower portion of this apparatus of Figure 2 is an assembly of air-pressure operative parts. Element 51 is a solid block of material, as for example, aluminum or such other material as may be easily drilled for providing conduits for the flow of air. A tube 52 enters block 51 at the point indicated and communicates with a conduit 52A which extends all the way through this block. At some point in conduit 52A is an enlarged section as illustrated with the section identified by reference numeral 58 serving as a seat for a ball valve 57. The portion of this enlarged section identified by reference numeral 59 also serves as a seat for the ball valve 57. When this ball valve 57 is moved to the right, it approaches seat 58 while if the ball moves toward the left it approaches seat 59. Tube 52A within the block 51 is provided with a side conduit 53A extending through the block as illustrated and connects with a tube 53 which terminates at an expansive bellows 55. To this bellows 55 is rigidly attached a pin 56 to the opposite end of which is attached the valve ball 57. Conduit 53A is provided with an orifice element 54, as shown. The tube 53 also has a side connecting tube 60 which terminates as said bleed orifice 71. Tube 60 is also provided with a side tube 61, which also terminates in a bleed orifice 62. In like manner this latter tube 61 is provided with a side tube 63, to the end of which is connected a bellows 64. This bellows in turn is connected to a baffle 65, as illustrated. This baffle 65 is attached to another bellows 73. To the air inlet tube 52 is provided a side connecting tube 67, to which is connected a side tube 69, this latter tube being connected operatively to the bellows 73. Tube 67 continues and terminates as a bleed orifice 70. The baffle 65 to which bellows 64 and 73 are attached is provided with a stationary pivot 66 as shown. This entire assembly of apparatus illustrated in Figure 2 and identified broadly by reference numeral 38, is the apparatus of Figure 1 identified broadly by reference numeral 38.

As mentioned hereinbefore, the lower thermocouple 25 of Figure 1 is intended to assist in throttling steam flow to the reboiler when temperature at that point exceeds a certain maximum and to increase the flow of steam when temperature at said point is below a certain minimum and to remain less effective operatively when temperature at that point is between said minimum and said maximum. Thus for exemplary purposes, let us assume the minimum temperature of 248° and a maximum temperature of 254° which gives an operable temperature variation which is considered not too great at the point at which thermocouple 25 is installed. The upper thermocouple 24 is intended to hold the column contents at that point at a temperature of from 189° to 190° F. in the debutanizing operation. When thermocouple 24 is exposed to a temperature higher than 190° F. the temperature recorder controller apparatus 27 is intended to restrict the air pressure in line 29. When the air pressure in line 29 decreases, it is intended that the right hand side of the ratio totalizer assembly move upward in such a manner that the valve 91 is moved closer to its seat under the influence of the compression spring 92 and at least some of the air pressure in the region of this compression spring is bled off through bleed opening 94. This reduction of air pressure is transmitted through conduit 42 to reduce the air pressure on the underside of the diaphragm of the motor of valve 44. This reduction is pressure, along with the normal bleeding of air pressure through bleed opening 45 further reduces the pressure on the underside of the diaphragm and permits throttling of the valve and accordingly a decrease in the flow of steam to the reboiler 20. In this manner when the temperature in the upper portion of column 12 gets too high the thermocouple 24 with its auxiliary apparatus operates to throttle the flow of steam to the reboiler. The higher the temperature at the control point 24 the greater is this steam throttling effect.

When the temperature in the region of the thermocouple 24 drops below 189°, reverse operational steps occur and air pressure in pipe 42 is increased with the result that the motor valve 44 is opened further to increase the flow of steam to the reboiler. The lower the temperature at the control point 24 the greater is the increase of pressure fluid in pipe 42 and the throttle valve 44 is opened further to permit flow of more steam.

The apparatus 38 used in conjunction with thermocouple 25 and controller 30 is intended to operate in such a manner that when the temperature in the region of the thermocouple exceeds for example 254°, the throttle valve 44 is intended to throttle the flow of steam to the reboiler even before the high temperature heat front has reached the region of thermocouple 24. This operation is as follows: When thermocouple 25 experiences a temperature above 254°, the temperature recorder controller 30 operates to decrease the air pressure in line 33, which in turn contracts the bellows 34 to move the pull rod 35 from right to left, Figures 1 and 2. Upon reference to Figure 2, when this pull rod 35 moves from right to left, since pivot point 37 is fixed the lever 36 moves the movable bar 80 to the right to such an extent that the baffle 75 restricts the flow of air from bleed orifice 70. When air flow from this orifice is restricted, pressure in tubes 67 and 69 builds up with the result that bellows 73 expands, which expansion pushes baffle 65 in the direction of the bleed orifice 62 with the result that air flow therethrough is restricted. When air flow through bleed orifice 62 is restricted, pressure builds up in tubes 61 and 63, with the result that bellows 64 expands to assist in further restricting air flow through orifice 62. When air pressure in tubes 63, 61 and 60 is thus further increased, this increase of pressure is transmitted through tube 53 to the bellows 55, which expands and pushes pin 56 and valve ball 57 to the left and closer to seat 59. When this movement occurs, less air pressure from line 52 than previously is transmitted between the ball valve 57 and its seat 59, and the result is that air pressure in tube 39 may be reduced by bleeding between the valve 57 and seat 58 to the atmosphere. Thus the air pressure in tube 39 decreases. On reference to Figure 1, when the air pressure in tube 39 decreases, the left hand side of the ratio totalizer 40 tends to move downward and the right hand side to move upward with the result that the valve 91 (Fig. 3) approaches its seat and some air pressure within the region of the compression spring 92 bleeds out through opening 94 resulting in a decrease in air pressure in tubes 42 and 43. Air also bleeds normally from the diaphragm housing through tube 45. This decrease of air pressure on the underside of the motor valve diaphragm permits the valve to throttle and to reduce the flow of steam to the reboiler with the overall result that the temperature of the material in the fractionator 12 in the region of thermocouple 25 very soon decreases.

It is intended that as long as the temperature on tray No. 7 and in the region of thermocouple 25 is between, for example 248° and 254°, the air flow through orifice 70 will not be unduly restricted by the proximity of baffle 75, but the baffle 76 will be in the position illustrated in Figure 2 and air flow through orifice 71 will be substantially fully restricted. When bar 80 moves toward the right and spring 81 becomes compressed baffle 76 actually contacts the bleed orifice 71 and very little air bleeds therethrough. When this condition exists and at least some air is flowing through orifice 70, the bellows 73 will not be fully expanded and baffle 65 will permit some air flow through orifice 62. Acting against this, when baffle 76 is against orifice 71 pressure will be present in tubes 60, 61 and 63, and bellows 64 will expand and tend to move baffle 65 to close proximity of orifice 62. Thus under this condition bellows 73 and bellows 64 act oppositely and their effect in general is to restrict somewhat air flow from orifice 62. The general result of this operation is that some air bleeds through orifice 62 and the ultimate pressure in tubes 61, 60 and 53 is intermediate the pressure existing when orifice 71 is closed and when appreciable air flows through this orifice. Thus this air of intermediate pressure is transmitted on through conduit 53 to bellows 55, and the ball valve 57 is held in about a central position as indicated in Figure 2. When ball 57 is thus positioned some instrument air pressure from line 52 is able to flow past seat 59 and maintain an intermediate pressure in line 39. This intermediate pressure in tube 39 is exerted on the underside of diaphragm 97 of Figure 3, and this intermediate pressure permits the diaphragm of valve 44 to be held in about an intermediate position with the admission of some steam through valve 44 to the reboiler. The passage of this intermediate amount of steam through valve 44 is intended to hold the reboiler section at such a temperature that temperature on tray No. 7 is maintained somewhere between the above mentioned 248° and 254° F.

Under this condition, that is, when the contents of tray No. 7 are between 248° and 254° F. the thermocouple 24 with its auxiliary apparatus averages off the operational effects from thermocouple 25 to operate throttle valve 44. Whether this averaging off opens more or throttles valve 44 depends upon whether temperature at the primary control point 24 is below 189° or above 190° F.

When temperature on tray No. 7 decreases to a value below 240°, thermocouple 25 operates the controller 30 in such a manner that the movable bar 80 moves an appreciable distance to the left, which movement permits orifice 70 to flow more air and permits at least some opening of orifice 71. Thus, air pressures in bellows 73 and 64 are reduced, which reduction permits more air flow through orifice 62, to reduce further air pressure in tube 61. Thus, the air pressure in tube 61 and tube 60 is appreciably reduced and this reduction of pressure contracts bellows 55 and moves ball valve 57 to the right and approaching seat 58, which movement increases the flow of air from tube 52 around seat 59 to tube 39. When air pressure increases in tube 39, the left hand side of the ratio totalizer 40 rises and the right hand side causes valve 91 to open further with the admission of more air pressure to tube 42. When air pressure increases in this tube, this pressure is transmitted to the underside of the diaphragm of motor valve 44 to open further this valve to the flow of more steam with the result that steam flow to the reboiler is increased and this increased flow of steam continues until the temperature on tray No. 7 reaches about 248°. When the thermocouple 25 is heated to about 248° F. its auxiliary apparatus parts move baffle 76 against orifice 71, which condition causes air pressure in tube 69 to be maintained at the above described intermediate value.

When temperature on tray No. 7 is below 248° or above 254° F. thermocouple 25 is intended to be the predominant control of the throttle valve 44 and when temperature at thermocouple 25 is between these values thermocouple 25 is intended to be averaged off by the effect of thermocouple 24, which predominates this averaging off operation.

Regarding the operation of thermocouple 25, the higher the No. 7 tray temperature is above 254° F. the greater is its averaging effect exerted on motor valve 44 and likewise the further the temperature tray No. 7 is below 248° F. the greater is its averaging effect in further opening the motor valve 44.

While in the foregoing description we have described elements 24 and 25 as being thermocouples, they may be thermocouples and operate as described but these elements may also be gas or mercury filled tubes and function to operate the temperature-recorder-controllers 27 and 30 as herein described.

By changing the position of the fulcrum 100 of the ratio totalizer 40, the respective effects of the upper and lower control point thermocouples (24 and 25) may be varied. Thus when the fulcrum 100 is centered with respect to the length of the beams 99, equal pressures in lines 29 and 39 have equal averaging effects on the throttle valve 44. However, when fulcrum 100 is placed to the left of center, and air pressures in lines 29 and 39 are equal, the pressure from line 29 exerts a greater movement tending to rotate beams 99 than does the pressure from line 39, and hence control thermocouple 24 overrides to some extent the operating effect from thermocouple 25. Similarly when the fulcrum is positioned to the right of center, the effect of thermocouple somewhat overrides the effect from the primary control point (thermocouple 24).

While certain embodiments of our invention have been described for illustrative purposes, the invention obviously is not limited thereto.

For exemplary purposes a temperature maximum and minimum of 254° and 248° F., respectively were assumed. To adjust the apparatus for operating with other temperature limits, baffles 75 and 76 are adjustable with respect to their pivoting to bar 80. By repositioning baffle 75 closer to orifice 70 raises the minimum temperature as for example from 248° to 249° or 250° F., and vice versa. Repositioning baffle 76 with respect to bar 80 by, for example, use of a setscrew adjuster in the right hand end of bar 80, raises or lowers the maximum temperature. Thus upon adjusting baffle 76 closer to baffle 75, the temperature spread between maximum and minimum is decreased by lowering the maximum temperature, and vice versa.

We claim:

1. A temperature control for a packed vessel comprising, in combination, a heater for heating one end of said vessel, a first temperature responsive device disposed to respond to temperature changes at a first point in said vessel remote from said one end, said first temperature responsive device being adapted to control and vary the heat supplied to said vessel by said heater approximately in inverse proportion to the temperature at said first point, and a second temperature responsive device, said second temperature responsive device being disposed to respond to temperature changes at a second point in said vessel between and spaced from said one end and said first point, said first and second devices being operatively connected to deliver pressure fluid cooperatively to opposite ends of a balance beam-valve assembly, the valve of said balance beam-valve assembly being adapted to control the flow of pressure fluid to opposite ends of said balance beam in opposition to pressure fluid from said first and second devices, said pressure fluid from said second device being adapted to average the effect of pressure fluid from said first device at predetermined maximum and minimum temperatures at said second point and vary the heat supplied to said vessel as inverse function of the temperatures of said second point.

2. A temperature control for a packed vessel comprising, in combination, a heater for said vessel, a conduit for supplying a heating medium to said heater, a pressure fluid operated motor valve in said conduit for controlling the flow of said heating medium to said heater, a first temperature responsive device disposed to respond to temperature changes at a first point in said vessel spaced from said heater and operatively connected to control and vary the heat supplied to said vessel by said heater approximately in inverse proportion to the temperature at said first point, a second temperature responsive device disposed to respond to temperature changes at a second point in said vessel between and spaced from said heater and said first point, said first and second devices being operatively connected to deliver pressure fluid cooperatively to opposite ends of a balance beam-valve assembly, the valve of said balance beam-valve assembly being adapted to control the flow of pressure fluid to opposite ends of said balance beam in opposition to the pressure fluid from said first and second devices, said pressure fluid from said second device being adapted to average the effect of the pressure fluid from said first device at predetermined maximum and minimum temperatures at said second point and vary the pressure fluid to the pressure fluid motor of said motor valve to vary the flow of heating medium in said conduit to said heater as an inverse function of the temperatures of said second point.

3. An apparatus for controlling the temperature in a packed process vessel wherein heat is added at a first point and heat is removed at a second point spaced from said first point, comprising, in combination, means for adding heat at said first point, means for removing heat at said second point, a first thermal responsive element at a primary control point intermediate said first and second points, a second thermal responsive element intermediate said first thermal responsive element and said first point, a first temperature controller in operative communication with said first thermal responsive element, a second temperature controller in operative communication with said second thermal responsive element, a ratio totalizer having a balance beam pivoted at a point intermediate its ends, one end of said beam being in pneumatic communication with said first temperature controller in such a manner that upon increase of gas pressure on said one end of said beam, said one end tends to rotate, the other end of said beam being in pneumatic communication with a pneumatically operated pneumatic controller in such a manner that upon increase of gas pressure on said other end of said beam said other end tends to rotate in the same angular direction as said one end, said pneumatic controller being operatively connected to said second temperature controller, a source of operational pressure fluid in operative communication with said ends of said beam tending to counter-rotate same, said means for adding heat at said first point comprising a heat exchange means in said vessel, conduits for conducting a heating medium to and from said heat exchange means, a pressure fluid operated motor valve in the conduit for conducting heating medium to said heat exchange means and means for supplying pressure fluid to the motor of said valve from said source of pressure fluid, and said pressure fluid supplied to said motor being controlled by said rotation and counter-rotation of said beam.

4. In a regulating system, in combination, a pressure fluid operated motor valve, means for supplying pressure fluid to the motor of said valve, means for controlling the supply of said pressure fluid to said motor including a balance beam and a pressure fluid dispensing valve cooperating with one end of said balance beam, means for rotating said balance beam around its balance point including a first pressure fluid supplying controller and a pressure fluid supplying controller assembly, said pressure fluid supplying controller assembly including a second pressure fluid controller and three nozzles, an orifice and a movable baffle cooperating with the orifice for each of said nozzles, a first temperature responsive means operatively communicating with said first pressure fluid supplying controller, a second temperature responsive means in spaced relation with said first temperature responsive means, said second temperature responsive means being disposed operatively in communication with said pressure fluid supplying controller assembly, one of said baffles being pivoted to a movable bar, a second of said baffles being pivoted to one end of a compression spring and being adapted to contact its nozzle when said spring is compressed, the other end of said compression spring being pivoted to said bar in such a manner that upon axial movement of said bar the spring loaded baffle and the baffle pivoted to said bar respectively contact and approach their respective nozzles and upon reverse axial movement of said bar said baffles move from close proximity and from contact with said nozzles in reverse order to restrict and to increase, respectively, pressure fluid flow through said respective nozzles, a source of pressure fluid for said nozzles and for said first and second pressure fluid controllers, means for transmitting said pressure fluid from said pressure fluid supplying controller assembly to said balance beam, the pressure fluid supplied from said pressure fluid supply controllers being adapted to cooperate in rotating said balance beam to supply said pressure fluid to said motor valve.

5. In a temperature regulating system, including a reaction vessel, heating means in said vessel, a pressure fluid operated motor valve arranged to control the flow of a heating medium to said heating means to maintain a predetermined temperature in said reaction vessel, means for controlling the supply of pressure fluid to the motor of said valve, the controlling means including in combination a first temperature responsive element in said vessel, a first temperature controller in operative communication with said first element, a second temperature responsive element in said vessel intermediate said first element and said heating means, a second temperature controller in operative communication with said second element, a pressure fluid operated and controlling assembly in operative communication with said second temperature controller and with a pressure fluid averaging controller, said first temperature controller being operatively connected with said averaging controller, said first temperature controller and said pressure fluid operated and controlling assembly separately transmitting pressure fluid to opposite ends of a balance beam of said averaging controller, said balance beam pivoted at a point intermediate said opposite ends, a source of pressure fluid for actuating said balance beam around its pivot rotatably opposed to the action of said pressure fluid from said first temperature controller and from said controlling assembly, conduit means for conducting pressure fluid from said source to the motor of said motor valve in response to rotation of said beam around said pivot.

References Cited in the file of this patent

UNITED STATES PATENTS

| | | |
|---|---|---|
| 2,156,458 | Long | May 2, 1939 |
| 2,218,341 | Newell | Oct. 15, 1940 |
| 2,296,325 | Bak | Sept. 22, 1942 |
| 2,312,772 | Osterheld | Mar. 2, 1943 |
| 2,375,380 | Osterheld | May 8, 1945 |
| 2,499,760 | Kimball | Mar. 7, 1950 |

FOREIGN PATENTS

| | | |
|---|---|---|
| 839,747 | France | Jan. 7, 1939 |